(12) United States Patent
Sekine (10) Patent No.: US 11,782,613 B1
(45) Date of Patent: Oct. 10, 2023

(54) MEMORY SYSTEM AND METHOD

(71) Applicant: Kioxia Corporation, Tokyo (JP)

(72) Inventor: Takuya Sekine, Yokohama (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/806,822

(22) Filed: Jun. 14, 2022

(30) Foreign Application Priority Data

Feb. 1, 2022 (JP) .................................. 2022-014219

(51) Int. Cl.
*G06F 3/06* (2006.01)
(52) U.S. Cl.
CPC .......... *G06F 3/0625* (2013.01); *G06F 3/0607* (2013.01); *G06F 3/0658* (2013.01); *G06F 3/0688* (2013.01)
(58) Field of Classification Search
CPC ........................ G06F 3/06; G06F 1/3203–3231
See application file for complete search history.

(56) References Cited

U.S. PATENT DOCUMENTS

| | | | |
|---|---|---|---|
| 7,539,883 B2 | 5/2009 | Kojou et al. | |
| 10,503,239 B2 | 12/2019 | Bito | |
| 10,684,672 B2 | 6/2020 | Koyama et al. | |
| 11,175,835 B2 * | 11/2021 | Kwak | G06F 3/0679 |
| 2005/0144490 A1 * | 6/2005 | Igari | G06F 1/3253 |
| | | | 713/300 |
| 2006/0277344 A1 | 12/2006 | Yasui et al. | |

FOREIGN PATENT DOCUMENTS

JP 2013-118630 A 6/2013

* cited by examiner

*Primary Examiner* — Khoa D Doan
(74) *Attorney, Agent, or Firm* — Oblon, McClelland, Maier & Neustadt, L.L.P.

(57) ABSTRACT

According to one embodiment, a memory system includes first, second, and third controllers. The first/second controller sets a first/second link to an operating or low power consumption state. The third controller sends a busy signal to the first and second controllers when transfer of a packet via the first or second link is predicted. When the first link is in the low power consumption state and a packet has not been received via the first link, the first link is maintained in the low power consumption state by disabling the busy signal. When the first link is in the operating state and a packet has not been received via the first link, the first link is transitioned to the low power consumption state upon absence of packets transferred via the first link for a first period of time, by disabling the busy signal.

20 Claims, 6 Drawing Sheets

MEMORY SYSTEM AND METHOD

CROSS-REFERENCE TO RELATED APPLICATIONS

This application is based upon and claims the benefit of priority from Japanese Patent Application No. 2022-014219, filed Feb. 1, 2022, the entire contents of which are incorporated herein by reference.

FIELD

Embodiments described herein relate generally to a memory system.

BACKGROUND

The PCI Express (PCIe) (registered trademark) standard is known as one of the interface standards for connecting an information processing apparatus and a device. With an interface conforming to the PCIe standard, the information processing apparatus and the device are connected via a transmission path that is referred to as a link. Over the link, data is transferred using a packet. The data transferred using the packet includes, for example, a request from the information processing apparatus to the device, a response from the device to the information processing apparatus, or user data.

The PCIe standard defines a function capable of setting the link to a low power consumption state even when the device is in an operating state. This function is referred to as Active State Power Management (ASPM).

When there is no packet transfer over the link for a specific period of time, the device causes the link to transition from a normal operating state to the low power consumption state according to the ASPM function. In the PCIe standard, the normal operating state is defined as, for example, a link power state L0. The low power consumption state is defined as, for example, a link power state L1.

When the link returns from the low power consumption state to the normal operating state, for example, a delay of a few microseconds (μs) occurs. This delay may degrade the performance of packet transfer over the link. Therefore, in a case where packet transfer over the link is predicted, the device is controlled to prevent the link from transitioning to the low power consumption state.

The device may include multiple ports of an interface that conforms to the PCIe standard. For example, the device including two ports can perform packet transfer to and from two information processing apparatuses over two links respectively.

DETAILED DESCRIPTION

Various embodiments will be described hereinafter with reference to the accompanying drawings.

In general, according to one embodiment, a memory system is capable of connecting to each of hosts via a serial interface. The hosts includes at least a first host and a second host. The memory system includes a nonvolatile memory, a first controller, a second controller, and a third controller. The first controller sets a first link between the first host and the memory system to either an operating state or a low power consumption state that consumes lower power than the operating state. The second controller sets a second link between the second host and the memory system to either the operating state or the low power consumption state. The third controller processes a request for the nonvolatile memory by using data contained in a packet that is received via each of the first and second links. The third controller sends a busy signal to the first controller and the second controller in a case where transfer of a packet via either the first link or the second link is predicted. In a case where the first link is in the low power consumption state and a packet that contains data to be transferred to the third controller has not been received via the first link, the first controller maintains the first link in the low power consumption state by disabling the busy signal. In a case where the first link is in the operating state and a packet that contains data to be transferred to the third controller has not been received via the first link, the first controller transitions the first link to the low power consumption state in accordance with absence of packets transferred via the first link for a first period of time, by disabling the busy signal.

Figure 1:
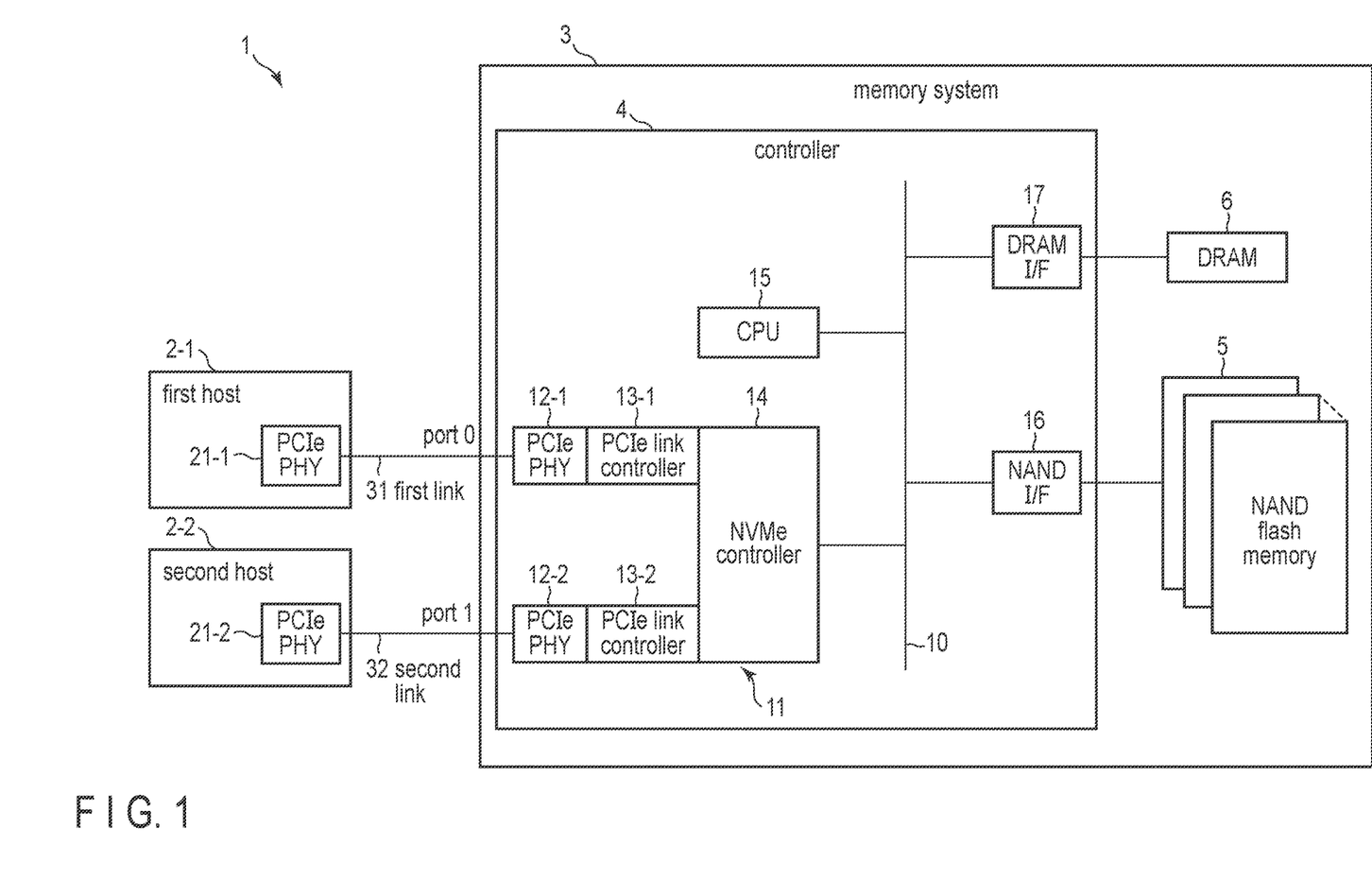
FIG. 1 is a block diagram illustrating an example of a configuration of an information processing system that includes a memory system according to an embodiment.

First, a configuration of an information processing system 1 that includes a memory system according to an embodiment will be described with reference to FIG. 1. The information processing system 1 includes a first host device 2-1, a second host device 2-2, and a memory system 3. Hereinafter, the first host device 2-1 is referred to as a first host 2-1. The second host device 2-2 is referred to as a second host 2-2. In a case where the first host 2-1 and the second host 2-2 are not distinguished, they are referred to as a host 2. Note that the information processing system 1 may include three or more hosts 2.

Each of the first host 2-1 and the second host 2-2 may be a storage server that stores a large amount of various user data in the memory system 3, or may be a personal computer.

The memory system 3 is a semiconductor storage device configured to write user data to a nonvolatile memory, such as a NAND flash memory, and read user data from the nonvolatile memory. The memory system 3 is also referred to as a storage device. The memory system 3 is realized as, for example, a solid state drive (SSD).

The memory system 3 may be used as a storage of the first host 2-1 and the second host 2-2. The memory system 3 is connected to each of the first host 2-1 and the second host 2-2.

An interface for connecting each of the first host 2-1 and the second host 2-2 and the memory system 3 conforms to standards such as PCI Express (PCIe) (registered trademark) or NVM Express (NVMe) (registered trademark).

The first host 2-1 includes a PCIe PHY 21-1. The second host 2-2 includes a PCIe PHY 21-2. The PCIe PHYs 21-1 and 21-2 are circuits corresponding to the physical layer defined in the PCIe standard. The PCIe PHYs 21-1 and 21-2 each have a physical connection form that conforms to the PCIe standard.

The memory system 3 includes, for example, a controller 4, a NAND flash memory 5, and a dynamic random access memory (DRAM) 6.

The NAND flash memory 5 includes one or more memory chips. Each of the memory chips includes multiple blocks. The blocks each function as a minimum data erase unit. The block may also be referred to as an erase block or a physical block. Each of the blocks includes multiple pages. Each of the pages includes memory cells connected to a single word line. The pages each function as a unit of a data write operation and a data read operation. Note that a word line may also function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation to write data in each page of the block.

The DRAM 6 is a volatile memory. A RAM, such as the DRAM 6, includes, for example, a storage area of a firmware (FW), and a cache area of a logical-to-physical address conversion table.

The controller 4 may be realized with a circuit such as a system-on-a-chip (SoC). The controller 4 may include a static random access memory (SRAM). In this case, the memory system 3 may not include the DRAM 6. Furthermore, the DRAM 6 may be provided inside the controller 4. The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, and (2) process to hide a difference between read/write operations executed in units of page and erase operations executed in units of block. The block management includes management of defective blocks, wear leveling, and garbage collection.

The logical address is an address used by the host 2 for addressing a storage area of the memory system 3. The logical address is, for example, a logical block address (LBA).

Management of mapping between each logical address and each physical address is executed using the logical-to-physical address conversion table. The controller 4 uses the logical-to-physical address conversion table to manage the mapping between each logical address and each physical address with a certain management size. A physical address corresponding to a logical address indicates a physical memory location in the NAND flash memory 5 to which data of the logical address is written. The logical-to-physical address conversion table may be loaded from the NAND flash memory 5 to the DRAM 6 when the memory system 3 is powered on.

Data write into one page is executable only once in a single P/E cycle. Thus, the controller 4 writes updated data corresponding to a logical address not to an original physical memory location in which previous data mapped to the logical address is stored but to a different physical memory location. Then, the controller 4 updates the logical-to-physical address conversion table to associate the logical address with the different physical memory location than the original physical memory location and to invalidate the previous data.

The controller 4 includes, for example, a host interface (host I/F) 11, a central processing unit (CPU) 15, a NAND interface (NAND I/F) 16, and a DRAM interface (DRAM I/F) 17. These host I/F 11, CPU 15, NAND I/F 16, and DRAM I/F 17 may be connected via a bus 10.

The CPU 15 is a processor configured to control the host I/F 11, the NAND I/F 16, and the DRAM I/F 17. The CPU 15 performs various processes by executing the FW loaded from the NAND flash memory 5 onto the DRAM 6. The FW is a control program including instructions for causing the CPU 15 to execute the various processes. The CPU 15 may perform command processes to execute various commands from the host 2. The operation of the CPU 15 is controlled by the FW executed by the CPU 15.

The NAND I/F 16 electrically connects the controller 4 and the NAND flash memory 5. The NAND I/F 16 conforms to an interface standard such as a toggle double data rate (DDR) and an open NAND flash interface (ONFI).

The NAND I/F 16 functions as a NAND control circuit configured to control the NAND flash memory 5. The NAND I/F 16 may be connected to the memory chips in the NAND flash memory 5 via multiple channels (Ch). By operating the memory chips in parallel, it is possible to broaden an access bandwidth between the controller 4 and the NAND flash memory 5.

The DRAM I/F 17 functions as a DRAM control circuit configured to control access of the DRAM 6.

The host I/F 11 is a circuit that functions as an interface that performs communication between the memory system 3 and each of the first host 2-1 and the second host 2-2. The host I/F 11 includes a circuit for receiving a packet from each of the first host 2-1 and the second host 2-2. The packet is, for example, a packet conforming to the PCIe standard. A received packet includes various commands, for example, input/output (I/O) commands and various control commands.

The host I/F 11 also includes a circuit for transmitting a packet to each of the first host 2-1 and the second host 2-2. A packet to be transmitted includes, for example, a response to a command and user data.

The host I/F 11 includes, for example, PCIe PHYs 12-1 and 12-2, PCIe link controllers 13-1 and 13-2, and an NVMe controller 14.

The PCIe PHYs 12-1 and 12-2 are circuits corresponding to the physical layer defined in the PCIe standard. The PCIe PHYs 12-1 and 12-2 each have, for example, a physical connection form that conforms to the PCIe standard.

The PCIe PHY 12-1 is connected to, for example, the PCIe PHY 21-1 of the first host 2-1 via a serial interface. This serial interface includes a link 31 (hereinafter, referred to as a first link 31) capable of interconnecting the PCIe PHY 12-1 and the PCIe PHY 21-1. The PCIe PHY 12-1 and the PCIe PHY 21-1 perform an interface operation for physically transmitting and receiving data via the first link 31.

The PCIe PHY 12-2 is connected to, for example, the PCIe PHY 21-2 of the second host 2-2 via a serial interface. This serial interface includes a link 32 (hereinafter, referred to as a second link 32) capable of interconnecting the PCIe PHY 12-2 and the PCIe PHY 21-2. The PCIe PHY 12-2 and the PCIe PHY 21-2 perform an interface operation for physically transmitting and receiving data via the second link 32. Over each of the first link 31 and the second link 32, data is transferred in the form of a packet.

The PCIe link controller 13-1 is a circuit that manages the first link 31 and performs processes for exchanging data between the PCIe PHY 12-1 and the NVMe controller 14. More specifically, the PCIe link controller 13-1 receives a packet from the first host 2-1 via the first link 31 and the PCIe PHY 12-1. The PCIe link controller 13-1 processes the packet, thereby acquiring, for example, data to be sent to the NVMe controller 14. The PCIe link controller 13-1 sends the acquired data to the NVMe controller 14. The data to be sent to the NVMe controller 14 is, for example, data related to access to the NAND flash memory 5. More specifically, the data to be sent to the NVMe controller 14 is, for example, a write request, a read request, and a Vendor Defined Message (VDM) for the NAND flash memory 5.

The PCIe link controller 13-2 is a circuit that manages the second link 32 and performs processes for exchanging data between the PCIe PHY 12-2 and the NVMe controller 14. More specifically, the PCIe link controller 13-2 receives a packet from the second host 2-2 via the second link 32 and the PCIe PHY 12-2. The PCIe link controller 13-2 processes the packet, thereby acquiring, for example, data to be sent to the NVMe controller 14. The PCIe link controller 13-2 sends the acquired data to the NVMe controller 14.

The NVMe controller 14 is a circuit that processes a transaction such as a write request, a read request, or a VDM for the NAND flash memory 5. The NVMe controller 14 performs: an operation according to a request in data that has been received via the PCIe PHY 12-1 and the PCIe link controller 13-1; an operation according to a request in data that has been received via the PCIe PHY 12-2 and the PCIe link controller 13-2; an operation for transmitting data, which includes a response to a request, via the PCIe PHY 12-1 and the PCIe link controller 13-1; and an operation for transmitting data, which includes a response to a request, via the PCIe PHY 12-2 and the PCIe link controller 13-2. The operations performed by the NVMe controller 14 conform to, for example, the NVMe standard.

Thus, the PCIe PHY 12-1, the PCIe link controller 13-1, and the NVMe controller 14 control data transfer between the first host 2-1 and the memory system 3. In addition, the PCIe PHY 12-2, the PCIe link controller 13-2, and the NVMe controller 14 control data transfer between the second host 2-2 and the memory system 3. In other words, the memory system 3 includes a port for performing data transfer to and from the first host 2-1 (hereinafter also referred to as a port 0) and a port for performing data transfer to and from the second host 2-2 (hereinafter also referred to as a port 1).

Note that the function of each unit in the controller 4 may be realized by dedicated hardware in the controller 4 or may be realized by the CPU 15 executing the FW.

Here, a link power state that is set for a link will be described. The link power state is a power state that is set for a link. The link power state is set according to, for example, an ASPM function defined in the PCIe standard. The ASPM function is a function capable of setting the link to a low power consumption state even when a device (e.g., the memory system 3) is in an operating state. The link power state includes, for example, a link power state L0 and a link power state L1. The link power state L0 is a normal operating state (active state). The link power state L1 is a low power consumption state (inactive state). The link power state L1 is also referred to as ASPM L1.

In a case where a link that has transitioned to the link power state L1 returns to the link power state L0, for example, a delay (exit latency) of a few microseconds occurs. This delay may degrade the performance of packet transfer over the link. Therefore, in a case where transfer of a packet over the link is predicted, the device (e.g., the memory system 3) performs control to prevent the link from transitioning to the link power state L1.

Examples of link power state control will be described using first and second comparative examples.

First Comparative Example

A memory system according to the first comparative example performs data transfer to and from one host.

Figure 2:
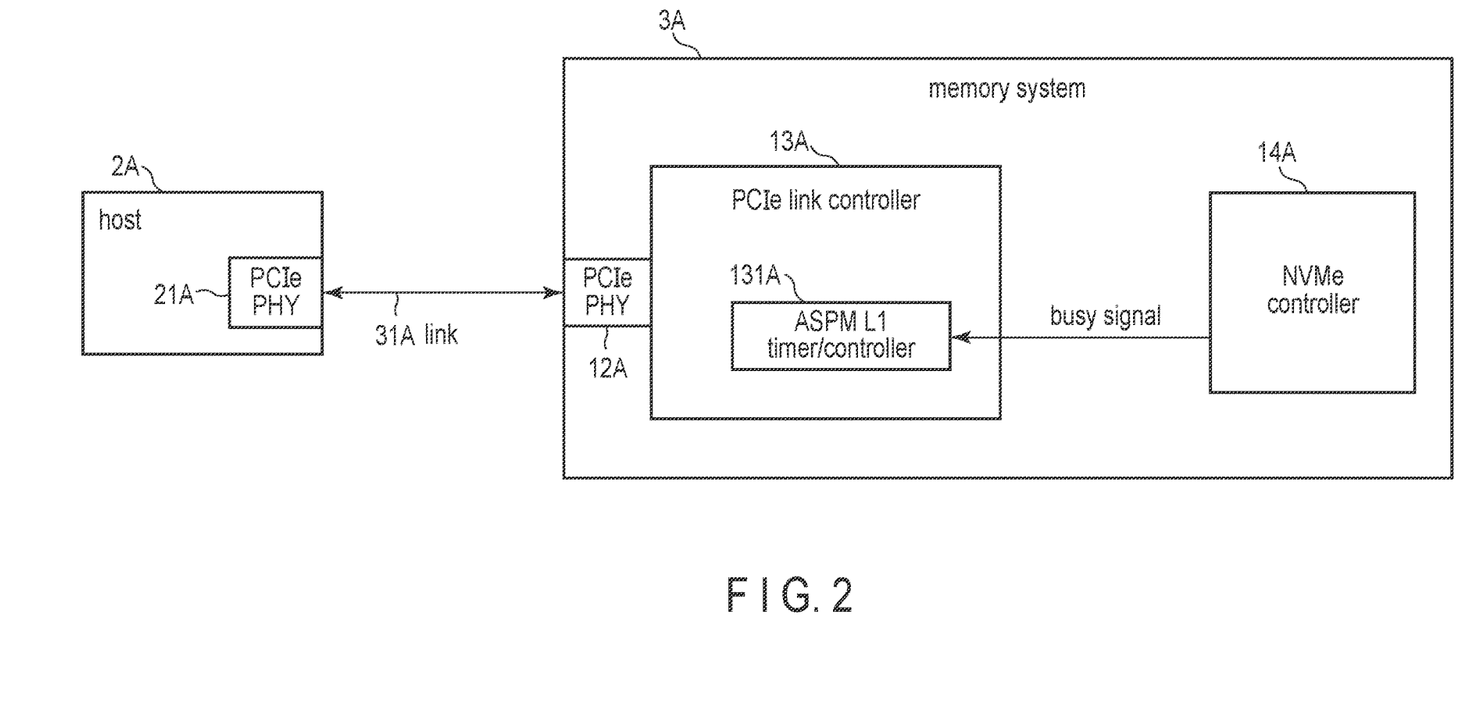
FIG. 2 illustrates an example of an operation in which a link with a host is maintained in a normal operating state (link power state L0) in a memory system according to a first comparative example.

FIG. 2 illustrates an example of an operation in which a link 31A with a host 2A is maintained in the link power state L0 (normal operating state) in a memory system 3A of the first comparative example.

The memory system 3A has one port for connecting to the host 2A. Specifically, the memory system 3A includes a PCIe PHY 12A, a PCIe link controller 13A, and an NVMe controller 14A.

The PCIe PHY 12A is connected to a PCIe PHY 21A of the host 2A via a serial interface. This serial interface includes the link 31A capable of interconnecting the PCIe PHY 12A and the PCIe PHY 21A.

The PCIe link controller 13A manages the link 31A between the PCIe PHY 12A and the PCIe PHY 21A, and performs processes for exchanging data between the PCIe PHY 12A and the NVMe controller 14A.

The NVMe controller 14A performs an operation according to a command in data that has been received via the PCIe PHY 12A and the PCIe link controller 13A, and an operation for transmitting data, which includes a response to a command, via the PCIe PHY 12A and the PCIe link controller 13A.

Thus, the PCIe PHY 12A, the PCIe link controller 13A, and the NVMe controller 14A control data transfer between the host 2A and the memory system 3A.

Here, a configuration of controlling a link power state in the memory system 3A will be described.

The PCIe link controller 13A includes an ASPM L1 timer/controller 131A.

The ASPM L1 timer/controller 131A is a circuit having an ASPM function. The ASPM L1 timer/controller 131A controls the link power state of the link 31A according to the ASPM function. More specifically, in a case where the link 31A is in the link power state L0, the ASPM L1 timer/controller 131A may function as a timer that measures time of duration of a state in which no packet is transferred through the link 31A. When the measured time has exceeded a threshold (i.e., when the timer has expired), the ASPM L1 timer/controller 131A transitions the link 31A from the link power state L0 to the link power state L1. This places the link 31A in a low power consumption state.

The NVMe controller 14A sends a busy signal to the ASPM L1 timer/controller 131A in a case where transfer of a packet via the link 31A is predicted. The busy signal indicates that the NVMe controller 14A is in a busy state. The NVMe controller 14A in the busy state predicts transfer of a packet via the link 31A.

When the busy signal has been sent from the NVMe controller 14A while the link 31A is in the link power state L1, the ASPM L1 timer/controller 131A transitions the link 31A to the link power state L0. Furthermore, while the link 31A is in the link power state L0 and the busy signal is sent from the NVMe controller 14A (i.e., the busy signal is active), the ASPM L1 timer/controller 131A does not measure the time of duration of a state in which packet transfer via the link 31A is not performed. Therefore, the ASPM L1 timer/controller 131A does not transition the link 31A from the link power state L0 to the link power state L1 while the busy signal is sent from the NVMe controller 14A.

According to the operation of the ASPM L1 timer/controller 131A in response to the busy signal, the link 31A does not transition from the link power state L0 to the link power state L1 when transfer of a packet via the link 31A is predicted. Therefore, in the operations of the ASPM L1 timer/controller 131A while the busy signal is received, neither transition of the link 31A from the link power state L0 to the link power state L1 nor transition of the link 31A from the link power state L1 to the link power state L0 occurs. Thus, a delay caused by transition from the link power state L1 to the link power state L0 does not occur. Hence, in a case where transfer of a packet via the link 31A is predicted, it is possible to prevent the performance of packet transfer via the link 31A from degrading.

Second Comparative Example

A memory system according to a second comparative example performs data transfer to and from each of two hosts.

Figure 3:
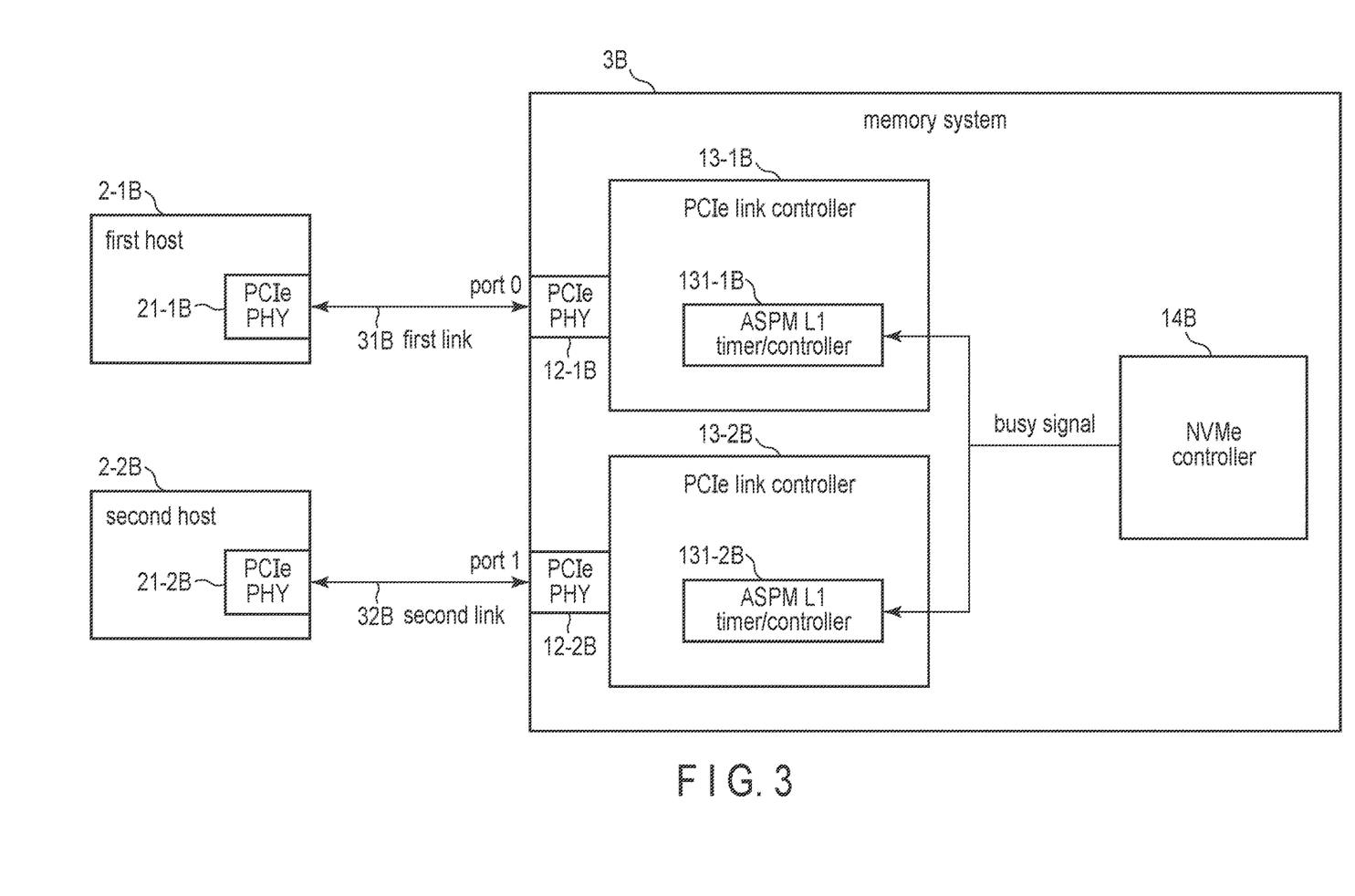
FIG. 3 illustrates an example of an operation in which links with respective two hosts are maintained in the normal operating state in a memory system according to a second comparative example.

FIG. 3 illustrates an example of an operation in which both a link 31B with a host 2-1B and a link 32B with a host 2-2B are maintained in the link power state L0 (normal operating state) in a memory system 3B according to the second comparative example.

The memory system 3B has two ports for connecting to the two hosts 2-1B and 2-2B, respectively. Specifically, the memory system 3B includes PCIe PHYs 12-1B and 12-2B, PCIe link controllers 13-1B and 13-2B, and an NVMe controller 14B.

The PCIe PHY 12-1B is connected to a PCIe PHY 21-1B of the host 2-1B via a serial interface. This serial interface includes the link 31B (hereinafter referred to as a first link 31B) capable of interconnecting the PCIe PHY 12-1B and the PCIe PHY 21-1B.

The PCIe PHY 12-2B is connected to a PCIe PHY 21-2B of the host 2-2B via a serial interface. This serial interface includes the link 32B (hereinafter referred to as a second link 32B) capable of interconnecting the PCIe PHY 12-2B and the PCIe PHY 21-2B.

The PCIe link controller 13-1B manages the first link 31B and performs processes for exchanging data between the PCIe PHY 12-1B and the NVMe controller 14B.

The PCIe link controller 13-2B manages the second link 32B and performs processes for exchanging data between the PCIe PHY 12-2B and the NVMe controller 14B.

The NVMe controller 14B performs an operation according to a command in data that has been received via either the PCIe PHY 12-1B and the PCIe link controller 13-1B or the PCIe PHY 12-2B and the PCIe link controller 13-2B, and an operation for transmitting data, which includes a response to a command, via either the PCIe PHY 12-1B and the PCIe link controller 13-1B or the PCIe PHY 12-2B and the PCIe link controller 13-2B.

Thus, the PCIe PHY 12-1B, the PCIe link controller 13-1B, and the NVMe controller 14B control data transfer between the host 2-1B and the memory system 3B. The PCIe PHY 12-2B, the PCIe link controller 13-2B, and the NVMe controller 14B control data transfer between the host 2-2B and the memory system 3B.

Here, a configuration of controlling a link power state in the memory system 3B will be described.

The PCIe link controller 13-1B includes an ASPM L1 timer/controller 131-1B.

The ASPM L1 timer/controller 131-1B is a circuit having an ASPM function that controls the link power state of the first link 31B. More specifically, while the first link 31B is in the link power state L0, the ASPM L1 timer/controller 131-1B may function as a timer that measures time of duration of a state in which no packet is transferred through the first link 31B. When the measured time has exceeded a threshold, the ASPM L1 timer/controller 131-1B transitions the link power state of the first link 31B from the link power state L0 to the link power state L1. This places the first link 31B in a low power consumption state.

The PCIe link controller 13-2B includes an ASPM L1 timer/controller 131-2B. The ASPM L1 timer/controller 131-2B controls the link power state of the second link 32B in the same manner as the ASPM L1 timer/controller 131-1B.

In a case where transfer of a packet via the link 31B or 32B is predicted, the NVMe controller 14B sends a busy signal to both the ASPM L1 timer/controller 131-1B and the ASPM L1 timer/controller 131-2B. The busy signal indicates that the NVMe controller 14B is in a busy state. The NVMe controller 14B in the busy state predicts transfer of a packet via the link 31B or 32B.

When the busy signal has been sent from the NVMe controller 14B while the first link 31B is in the link power state L1, the ASPM L1 timer/controller 131-1B transitions the first link 31B to the link power state L0. Furthermore, while the first link 31B is in the link power state L0 and the busy signal is sent from the NVMe controller 14B, the ASPM L1 timer/controller 131-1B does not measure the time of duration of the state in which packet transfer via the first link 31B is not performed. Therefore, while the busy signal is sent from the NVMe controller 14B, the ASPM L1 timer/controller 131-1B does not transition the first link 31B from the link power state L0 to the link power state L1.

When the busy signal has been sent from the NVMe controller 14R while the second link 32B is in the link power state L1, the ASPM L1 timer/controller 131-2B transitions the second link 32B to the link power state L0. Furthermore, while the second link 32B is in the link power state L0 and the busy signal is sent from the NVMe controller 14B, the ASPM L1 timer/controller 131-2B does not measure the time of duration of the state in which packet transfer via the second link 32B is not performed. Therefore, while the busy signal is sent from the NVMe controller 14B, the ASPM L1 timer/controller 131-2B does not transition the second link 32B from the link power state L0 to the link power state L1.

According to the operations of the ASPM L1 timer/controllers 131-1B and 131-2B in response to the busy signal, neither the link 31B nor the link 32B transitions from the link power state L0 to the link power state L1 in a case where transfer of a packet via the link 31B or 32B is predicted. Therefore, in the operations of the ASPM L1 timer/controller 131-1B in response to the busy signal, neither transition of the link 31B from the link power state L0 to the link power state L1 nor transition of the link 31B from the link power state L1 to the link power state L0 occurs. Furthermore, in the operations of the ASPM L1 timer/controller 131-2B in response to the busy signal, neither transition of the link 32B from the link power state L0 to the link power state L1 nor transition of the link 32B from the link power state L1 to the link power state L0 occurs. Thus, a delay caused by transition from the link power state L1 to the link power state L0 does not occur. Therefore, in a case where transfer of a packet via the link 31B or 32B is predicted, it is possible to prevent the performance of packet transfer via the link 31B or 32B from degrading.

Note that the NVMe controller 14B is configured so as not to determine whether the packet transfer predicted to occur is performed via the first link 31B or the second link 32B. Therefore, even if the packet transfer predicted to occur is performed via either the first link 31B or the second link 32B, the NVMe controller 14B sends the busy signal to both the ASPM L1 timer/controller 131-1B and the ASPM L1 timer/controller 131-2B.

In the memory system 3B, in a case where the packet transfer, which is predicted to occur, is performed via one of the two links 31B and 32B, and not via the other link, not only the one link but also the other link does not transition from the link power state L0 to the link power state L1 since the busy signal is sent to both the ASPM L1 timer/controller 131-1B and the ASPM L1 timer/controller 131-2B.

For example, in a case where the packet transfer predicted to occur is performed via the first link 31B and not via the second link 32B, the second link 32B does not transition from the link power state L0 to the link power state L1 according to the operation of the ASPM L1 timer/controller 131-2B based on the busy signal even though there is no packet transferred via the second link 32B for a specific period. Therefore, reduction of power consumption that results from the transition of the second link 32B to the link power state L1 is not obtained.

In contrast, in the memory system 3 of the present embodiment, each of the two PCIe link controllers 13-1 and 13-2 includes a circuit (hereinafter referred to as a busy signal control circuit) that enables or disables a busy signal sent from the NVMe controller 14. The busy signal control circuit enables or disables the busy signal according to whether or not a packet has been detected that contains data to be transferred from each of the two hosts 2-1 and 2-2 to the NVMe controller 14. In the memory system 3, the link power state of each of the two links 31 and 32 is controlled on the basis of the busy signal that is enabled or disabled by the busy signal control circuit. Therefore, in the memory system 3, in a case where packet transfer predicted to occur is performed via one of the two links 31 and 32, and not via the other link, the other link can transition from the link power state L0 to the link power state L1. Therefore, reduction of power consumption that results from transition of the other link to the link power state L1 can be obtained.

Figure 4:
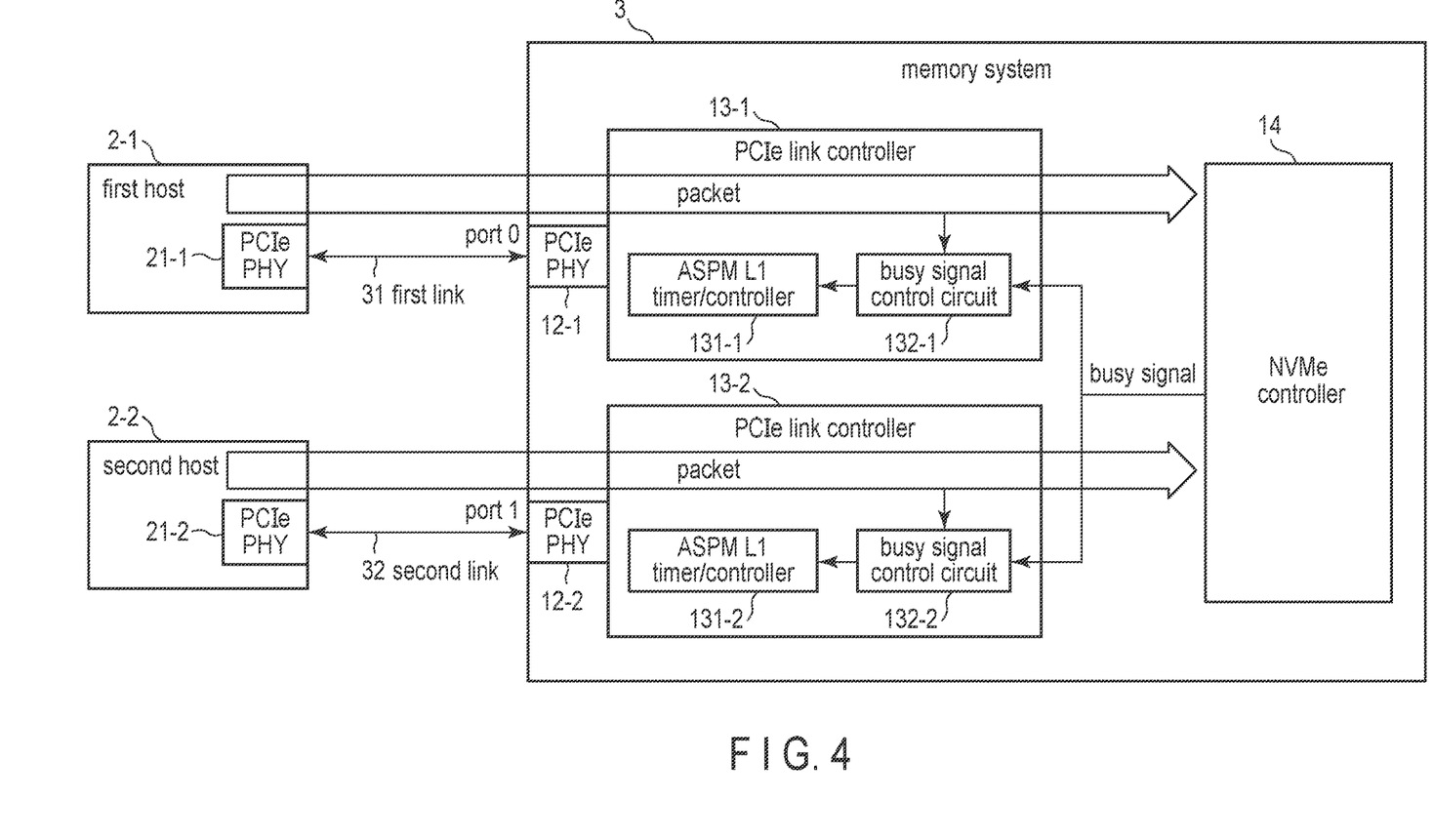
FIG. 4 is a block diagram illustrating an example of a configuration of controlling a link power state in the memory system according to the embodiment.

An example of a configuration of controlling the link power state in the memory system 3 of the present embodiment will be described in detail with reference to FIG. 4.

The PCIe link controller 13-1 includes an ASPM L1 timer/controller 131-1 and a busy signal control circuit 132-1. The PCIe link controller 13-2 includes an ASPM L1 timer/controller 131-2 and a busy signal control circuit 132-2.

The NVMe controller 14 sends the busy signal to the PCIe link controller 13-1 and the PCIe link controller 13-2 when transfer of a packet via one of the links 31 and 32 is predicted. Note that sending the busy signal is also referred to as setting the busy signal to active (i.e., asserting the busy signal). In addition, not sending the busy signal is also referred to as setting the busy signal to inactive (i.e., negating the busy signal). For example, the NVMe controller 14 sends the busy signal in a case where processes for all requests, which have been received from the hosts 2-1 and 2-2, are not completed (for example, in a case where responses to all the requests have not been returned). The busy signal sent from the NVMe controller 14 is received by the busy signal control circuits 132-1 and 132-2 instead of the ASPM L1 timer/controllers 131-1 and 131-2. The busy signal indicates that the NVMe controller 14 is in a busy state. The NVMe controller 14 in the busy state predicts transfer of a packet via one of the links 31 and 32.

The NVMe controller 14 predicts transfer of a packet via one of the links 31 and 32, for example, when data contained in a packet transmitted from the first host 2-1 via the first link 31 has been received from the PCIe link controller 13-1, or when data contained in a packet transmitted from the second host 2-2 via the second link 32 has been received from the PCIe link controller 13-2. Note that the NVMe controller 14 does not determine whether the packet transfer predicted to occur is performed via the first link 31 or the second link 32.

The NVMe controller 14 does not send the busy signal to either the PCIe link controller 13-1 or the PCIe link controller 13-2 when neither transfer of a packet via the link 31 nor transfer of a packet via the link 32 is predicted. For example, the NVMe controller 14 ends sending the busy signal, that is, the busy signal is changed from active to inactive, when the processes for all the requests received from the hosts 2-1 and 2-2 are completed (for example, when the responses to all the requests have been returned).

The busy signal control circuit 132-1 is a circuit that enables or disables the busy signal sent from the NVMe controller 14 according to whether or not a packet containing data transmitted from the first host 2-1 to the NVMe controller 14 via the first link 31 has been detected. Hereinafter, a packet containing data transmitted from either the first host 2-1 or the second host 2-2 to the NVMe controller 14 is also referred to as a target packet.

The busy signal control circuit 132-1 detects the target packet. More specifically, when the PCIe link controller 13-1 has received a packet via the first link 31 and the PCIe PHY 12-1, the busy signal control circuit 132-1 determines whether or not the packet contains data to be sent to the NVMe controller 14, for example. When the packet contains data to be sent to the NVMe controller 14, the busy signal control circuit 132-1 detects the packet as the target packet.

Alternatively, when the PCIe link controller 13-1 has received a packet, the busy signal control circuit 132-1 may determine whether or not the packet contains data related to access to the NAND flash memory 5. In this case, the busy signal control circuit 132-1 detects the packet containing the data related to access to the NAND flash memory 5 as the target packet.

The data related to access to the NAND flash memory 5 is, for example, data having a type that causes packet transfer via the first link 31 to occur later. The data having the type that causes packet transfer via the first link 31 to occur later is, for example, a write request, a read request, or a VDM for the NAND flash memory 5. The busy signal control circuit 132-1 may detect the packet containing data having the type that causes packet transfer via the first link 31 to occur later, as the target packet. In this case, the busy signal control circuit 132-1 can enable the busy signal only in a case where packet transfer via the first link 31 will occur later.

The busy signal control circuit 132-1 enables the busy signal in a case where the target packet has been detected. That is, in a case where the target packet has been detected, the busy signal control circuit 132-1 sends, to the ASPM L1 timer/controller 131-1, the busy signal sent from the NVMe controller 14 as it is.

More specifically, the busy signal control circuit 132-1 operates to enable the busy signal when the busy signal sent from the NVMe controller 14 is changed from inactive to active after the target packet has been detected. Furthermore, the busy signal control circuit 132-1 operates to enable the busy signal also in a case where the busy signal sent from the NVMe controller 14 is already active when the target packet has been detected. After that, when the busy signal is changed from active to inactive, the busy signal control circuit 132-1 resets its state. The busy signal control circuit 132-1 whose state has been reset operates to disable the busy signal.

On the other hand, in a case where the target packet has not been detected, the busy signal control circuit 132-1 disables the busy signal. That is, in a case where the target packet has not been detected, the busy signal control circuit 132-1 does not send, to the ASPM L1 timer/controller 131-1, the busy signal sent from the NVMe controller 14.

The ASPM L1 timer/controller 131-1 is a circuit having an ASPM function. The ASPM L1 timer/controller 131-1 controls the link power state of the first link 31 according to the ASPM function.

Specifically, the ASPM L1 timer/controller 131-1 may function as a timer to measure time of duration of a state in which no packet is transferred through the first link 31 while the first link 31 is in the link power state L0. When the measured time has exceeded a threshold, the ASPM L1 timer/controller 131-1 transitions the first link 31 from the link power state L0 to the link power state L1. This places the first link 31 in the low power consumption state.

Note that placing the first link 31 in the low power consumption state includes operating at least a part of a configuration in the memory system 3 that manages and controls the first link 31 in the low power consumption state. Furthermore, placing the first link 31 in the normal operating state includes operating the configuration in the memory system 3 that manages and controls the first link 31 in the normal operating state. The configuration in the memory system 3 that manages and controls the first link 31 includes, for example, the PCIe PHY 12-1 and the PCIe link controller 13-1.

When having received the busy signal from the busy signal control circuit 132-1 while the first link 31 is in the link power state L1, the ASPM L1 timer/controller 131-1 transitions the first link 31 to the link power state L0. Note that if the ASPM L1 timer/controller 131-1 does not receive the busy signal while the first link 31 is in the link power state L1, the first link 31 is maintained in the link power state L1. The ASPM L1 timer/controller 131-1 does not receive the busy signal in a case where the NVMe controller 14 does not send the busy signal or the busy control circuit 132-1 disables the busy signal sent from the NVMe controller 14.

The ASPM L1 timer/controller 131-1 does not measure the time of duration of a state in which packet transfer via the first link 31 is not performed while the first link 31 is in the link power state L0 and the busy signal is received from the busy signal control circuit 132-1. Therefore, while the busy signal is sent from the busy signal control circuit 132-1, the ASPM L1 timer/controller 131-1 does not transition the first link 31 from the link power state L0 to the link power state L1.

The ASPM L1 timer/controller 131-1 measures the time of duration of a state in which no packet is transferred through the first link 31 while the first link 31 is in the link power state L0 and the busy signal is not received from the busy signal control circuit 132-1. When the measured time has exceeded the threshold, the ASPM L1 timer/controller 131-1 transitions the first link 31 from the link power state L0 to the link power state L1. As a result, not only in a case where the NVMe controller 14 does not send the busy signal, but also in a case where the busy signal control circuit 132-1 disables the busy signal sent from the NVMe controller 14, the ASPM L1 timer/controller 131-1 can transition the first link 31 to the link power state L1 when the time of duration of a state in which no packet is transferred through the first link 31 has exceeded the threshold.

Therefore, in a case where the target packet has not been detected by the busy signal control circuit 132-1, that is, in a case where packet transfer predicted to occur is performed via the second link 32 and not via the first link 31, the period in which the first link 31 is in the link power state L1 can be extended, and the possibility of the first link 31 transitioning to the link power state L1 can be increased. As a result, power consumption can be reduced in a case where the multiple links 31 and 32 are used.

Note that the operations for the second link 32 performed by the busy signal control circuit 132-2 and the ASPM L1 timer/controller 131-2 in the PCIe link controller 13-2 and the NVMe controller 14 are the same as the operations for the first link 31 performed by the busy signal control circuit 132-1 and the ASPM L1 timer/controller 131-1 in the PCIe link controller 13-1 and the NVMe controller 14 described above.

Specific examples in which the link power states of the two links 31 and 32 are controlled in the memory system 3 will be described with reference to FIG. 5 and FIG. 6.

Figure 5:
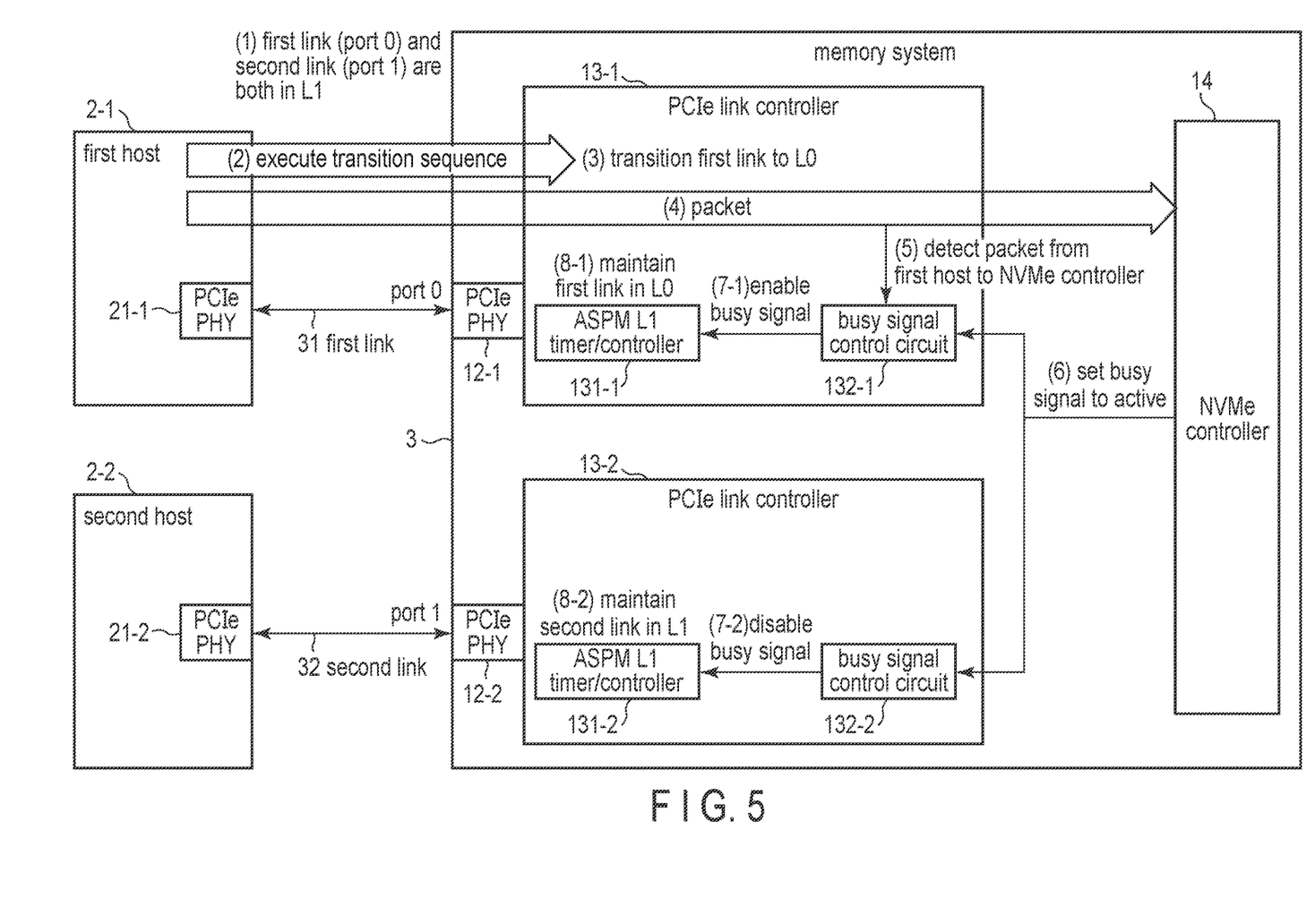
FIG. 5 illustrates an example of an operation in which one link transitions from a low power consumption state (link power state L1) to the normal operating state, and the other link is maintained in the low power consumption state in the memory system according to the embodiment.

FIG. 5 illustrates an example of an operation in which the first link 31 (port 0) transitions from the link power state L1 to the link power state L0, and the second link 32 (port 1) is maintained in the link power state L1. At the start of this operation, it is assumed that both the first link 31 and the second link 32 are in the link power state L1 ((1) in FIG. 5). Note that, at this start point, the busy signal sent from the NVMe controller 14 may be active or inactive.

The first host 2-1 requests to execute a transition sequence for transitioning the first link 31 to the link power state L0 in accordance with the generation of data to be transmitted to the memory system 3 ((2) in FIG. 5). This transition sequence includes training processing to make the first link 31 available, such as synchronizing clock signals between the first host 2-1 and the memory system 3.

The PCIe link controller 13-1 transitions the first link 31 to the link power state L0 according to the executed transition sequence ((3) in FIG. 5).

After the first link 31 transitions to the link power state L0, the first host 2-1 transmits a packet, which contains the data to be transmitted to the memory system 3, to the memory system 3 via the first link 31 ((4) in FIG. 5).

The PCIe link controller 13-1 receives the packet via the PCIe PHY 12-1. The PCIe link controller 13-1 processes the received packet, thereby acquiring, for example, data to be sent to the NVMe controller 14. The PCIe link controller 13-1 sends the acquired data to the NVMe controller 14.

The busy signal control circuit 132-1 detects the packet (target packet) containing the data that is transferred from the first host 2-1 to the NVMe controller 14 via the first link 31 ((5) in FIG. 5). For example, in a case where the packet received by the PCIe link controller 13-1 contains data to be sent to the NVMe controller 14, the busy signal control circuit 132-1 detects the packet as the target packet.

The NVMe controller 14 receives the data in the packet sent from the PCIe link controller 13-1. The NVMe controller 14 determines whether or not transfer of a packet via the link 31 or 32 is predicted on the basis of the received data. Here, it is assumed that transfer of a packet via the link 31 or 32 is predicted. In this case, the NVMe controller 14 set the busy signal to active ((6) in FIG. 5). Note that, in a case where the busy signal is already active, the NVMe controller 14 keeps the busy signal active. The active busy signal is received by the busy signal control circuit 132-1 and the busy signal control circuit 132-2.

Since the busy signal control circuit 132-1 has detected the target packet, it enables the busy signal received from the NVMe controller 14 ((7-1) in FIG. 5). That is, the busy signal control circuit 132-1 sends the busy signal to the ASPM L1 timer/controller 131-1.

Since the ASPM L1 timer/controller 131-1 has received the busy signal, it maintains the first link 31 in the link power state L0 ((8-1) in FIG. 5).

In this manner, since the busy signal control circuit 132-1 enables the busy signal in a case where the target packet has been detected, the first link 31 does not transition to the link power state L1 according to the operation of the ASPM L1 timer/controller 131-1. Therefore, it is possible to prevent the delay for returning the first link 31 from the link power state L1 to the link power state L0.

On the other hand, since the busy signal control circuit 132-2 has not detected the target packet, it disables the busy signal received from the NVMe controller 14 ((7-2) in FIG. 5). That is, the busy signal control circuit 132-2 does not send the busy signal to the ASPM L1 timer/controller 131-2.

Since the ASPM L1 timer/controller 131-2 has not received the busy signal, it maintains the second link 32 in the link power state L1 ((8-2) in FIG. 5).

In this manner, since the busy signal control circuit 132-2 disables the busy signal in a case where the target packet has not been detected, the second link 32 does not transition to the link power state L0 according to the operation of the ASPM L1 timer/controller 131-2. That is, the second link 32 is maintained in the link power state L1. Therefore, the second link 32 can be prevented from transitioning to the link power state L0 according to the busy signal sent from the NVMe controller 14 that has predicted transfer of a packet via the link 31 or 32. Thus, compared to a case where the busy signal control circuit 132-2 that disables the busy signal is not provided, the period in which the second link 32 is maintained in the link power state L1 can be extended. As a result, power consumption can be reduced.

Figure 6:
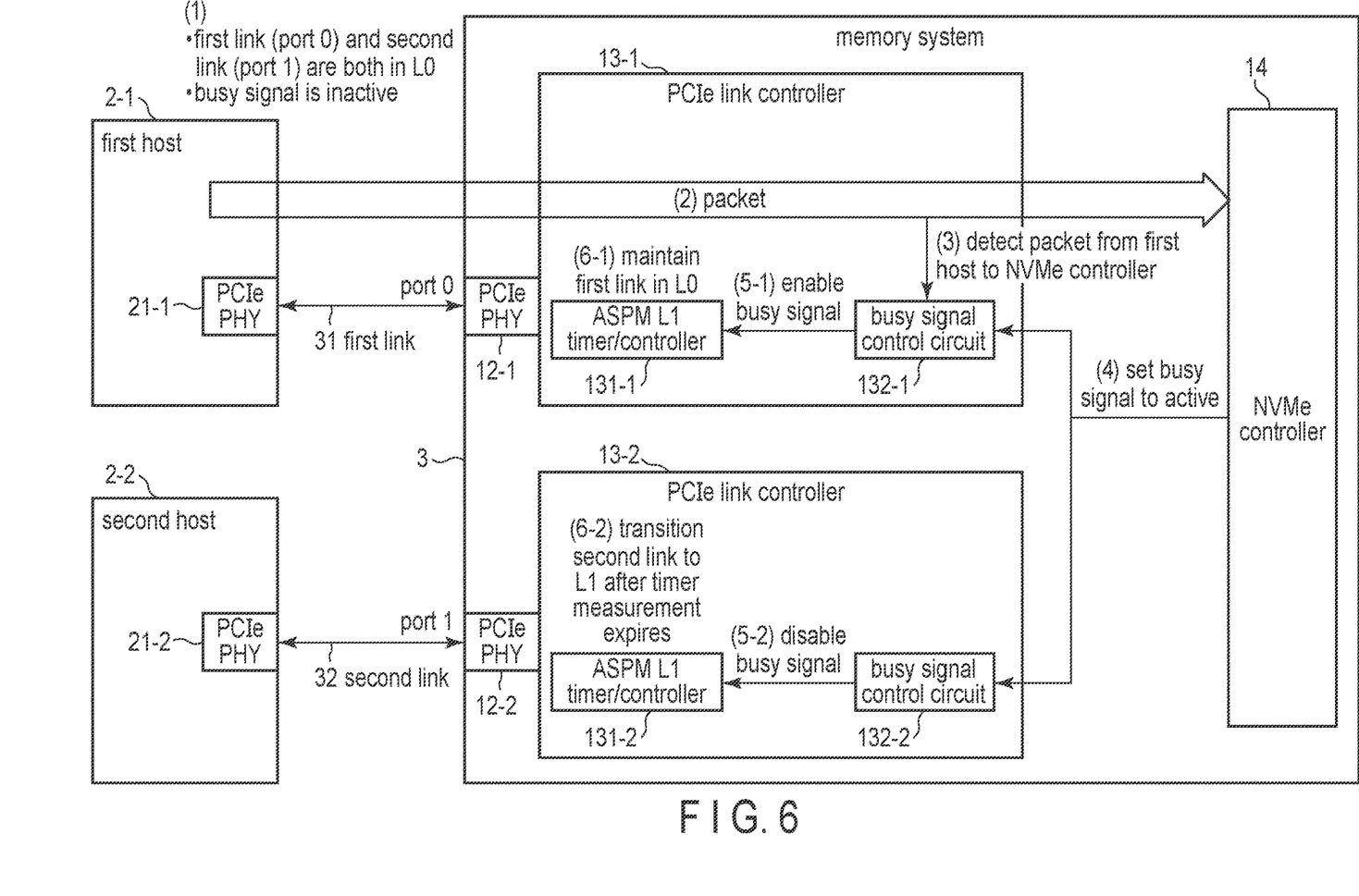
FIG. 6 illustrates an example of an operation in which one link is maintained in the normal operating state, and the other link transitions from the normal operating state to the low power consumption state in the memory system according to the embodiment.

FIG. 6 illustrates an example of an operation in which the first link 31 is maintained in the link power state L0, and the second link 32 transitions from the link power state L0 to the link power state L1. At the start of this operation, it is assumed that both the first link 31 and the second link 32 are in the link power state L0, and the busy signal sent from the NVMe controller 14 is inactive ((1) in FIG. 6).

The first host 2-1 transmits a packet, which contains data to be transmitted to the memory system 3, to the memory system 3 via the first link 31 ((2) in FIG. 6).

The PCIe link controller 13-1 receives the packet via the PCIe PHY 12-1. The PCIe link controller 13-1 processes the received packet, thereby acquiring, for example, data to be sent to the NVMe controller 14. The PCIe link controller 13-1 sends the acquired data to the NVMe controller 14.

The busy signal control circuit 132-1 detects the packet (target packet) that contains the data transferred from the first host 2-1 to the NVMe controller 14 via the first link 31 ((3) in FIG. 6). For example, in a case where a packet received by the PCIe link controller 13-1 contains data to be sent to the NVMe controller 14, the busy signal control circuit 132-1 detects the packet as the target packet.

The NVMe controller 14 receives the data in the packet sent from the PCIe link controller 13-1. The NVMe controller 14 determines whether or not transfer of a packet via the link 31 or 32 is predicted on the basis of the received data. Here, it is assumed that transfer of a packet via the link 31 or 32 is predicted. In this case, the NVMe controller 14 sets the busy signal to active ((4) in FIG. 6). The active busy signal is received by the busy signal control circuit 132-1 and the busy signal control circuit 132-2.

Since the busy signal control circuit 132-1 has detected the target packet, it enables the busy signal received from the NVMe controller 14 ((5-1) in FIG. 6). That is, the busy signal control circuit 132-1 sends the busy signal to the ASPM L1 timer/controller 131-1.

Since the ASPM L1 timer/controller 131-1 has received the busy signal, it maintains the first link 31 in the link power state L0 ((6-1) in FIG. 6).

In this manner, since the busy signal control circuit 132-1 enables the busy signal in a case where the target packet has been detected, the first link 31 does not transition to the link power state L1 according to the operation of the ASPM L1 timer/controller 131-1. Therefore, it is possible to prevent the delay for returning the first link 31 from the link power state L1 to the link power state L0.

On the other hand, since the busy signal control circuit 132-2 has not detected the target packet, it disables the busy signal received from the NVMe controller 14 ((5-2) in FIG. 6). That is, the busy signal control circuit 132-2 does not send the busy signal to the ASPM L1 timer/controller 131-2.

Since the ASPM L1 timer/controller 131-2 has not received the busy signal, it maintains measurement of the time of duration of a state in which no packet is transferred through the second link 32. Then, when the measured time has exceeded the threshold, the ASPM L1 timer/controller 131-2 transitions the second link 32 from the link power state L0 to the link power state L1 ((6-2) in FIG. 6).

In this manner, since the busy signal control circuit 132-2 disables the busy signal in a case where the target packet has not been detected, the ASPM L1 timer/controller 131-2 may transition the second link 32 to the link power state L1. That is, even in a case where the NVMe controller 14 predicts packet transfer via the link 31 or 32 and sends the busy signal, the ASPM L1 timer/controller 131-2 can transition the second link 32 to the link power state L1. Therefore, compared to a case where the busy signal control circuit 132-2 that disables the busy signal is not provided, the possibility that the second link 32 transitions to the link power state L1 is increased. Thus, the power consumption can be reduced.

As described above, according to the present embodiment, power consumption can be reduced in a case where multiple links for packet transfer are used. The PCIe link controller 13-1 sets the first link 31 between the first host 2-1 and the memory system 3 to either an operating state or a low power consumption state that consumes lower power than the operating state. The PCIe link controller 13-2 sets the second link 32 between the second host 2-2 and the memory system 3 to either the operating state or the low power consumption state. The NVMe controller 14 processes a request for a nonvolatile memory (e.g., the NAND flash memory 5) by using data contained in a packet received via each of the first link 31 and the second link 32. The NVMe controller 14 sends a busy signal to the PCIe link controller 13-1 and the PCIe link controller 13-2 in a case where transfer of a packet via either the first link 31 or the second link 32 is predicted. In a case where the first link 31 is in the low power consumption state and a packet that contains data to be transferred to the NVMe controller 14 has not been received via the first link 31, the PCIe link controller 13-1 maintains the first link 31 in the low power consumption state by disabling the busy signal. In a case where the first link 31 is in the operating state and a packet that contains data to be transferred to the NVMe controller 14 has not been received via the first link 31, the PCIe link controller 13-1 transitions the first link 31 to the low power consumption state in accordance with absence of packets transferred via the first link 31 for a first period of time, by disabling the busy signal.

With the above configuration, for example, in a case where transfer of a packet via the second link 32 is predicted, even if the NVMe controller 14 sends the busy signal to the PCIe link controller 13-1, the PCIe link controller 13-1 (more specifically, the busy signal control circuit 132-1) disables the busy signal for setting it to the operating state. Therefore, the period in which the first link 31 is in the low power consumption state can be extended, and the possibility of the first link 31 transitioning to the low power consumption state can be increased. Therefore, power consumption can be reduced in a case where multiple links for packet transfer are used.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system capable of connecting to each of hosts via a serial interface, the hosts including at least a first host and a second host, the memory system comprising:
    a nonvolatile memory;
    a first controller configured to set a first link between the first host and the memory system to either an operating state or a low power consumption state that consumes lower power than the operating state;
    a second controller configured to set a second link between the second host and the memory system to either the operating state or the low power consumption state; and
    a third controller configured to:
        process a request for the nonvolatile memory by using data contained in a packet that is received via each of the first and second links; and
        send a busy signal to the first controller and the second controller in a case where transfer of a packet via either the first link or the second link is predicted, wherein
    the first controller is further configured to:
        in a case where the first link is in the low power consumption state and a packet that contains data to be transferred to the third controller has not been received via the first link, maintain the first link in the low power consumption state by disabling the busy signal; and
        in a case where the first link is in the operating state and a packet that contains data to be transferred to the third controller has not been received via the first link, transition the first link to the low power consumption state in accordance with absence of packets transferred via the first link for a first period of time, by disabling the busy signal.

2. The memory system of claim 1, wherein
the second controller is further configured to, in a case where the second link is in the low power consumption state and a packet that contains data to be transferred to the third controller has been received via the second link, transition the second link from the low power consumption state to the operating state in accordance with the busy signal.

3. The memory system of claim 1, wherein
the second controller is further configured to, in a case where the second link is in the operating state and a packet that contains data to be transferred to the third controller has been received via the second link, maintain the second link in the operating state by enabling the busy signal.

4. The memory system of claim 1, wherein
the first controller is further configured to, in a case where the first link is in the operating state and sending the busy signal from the third controller is ended, transition the first link to the low power consumption state in accordance with absence of packets transferred via the first link for the first period of time.

5. The memory system of claim 1, wherein
the first controller includes a circuit configured to:
enable the busy signal when a packet that contains data to be transferred to the third controller has been received via the first link; and
disable the busy signal when a packet that contains data to be transferred to the third controller has not been received via the first link.

6. The memory system of claim 1, wherein
the first controller is further configured to send, when a packet that contains first data to be transferred to the third controller has been received via the first link, the first data to the third controller,
the second controller is further configured to send, when a packet that contains second data to be transferred to the third controller has been received via the second link, the second data to the third controller, and the third controller is configured to send, in accordance with reception of either the first data or the second data, the busy signal to the first controller and the second controller.

7. The memory system of claim 6, wherein the third controller is configured to:
   in a case where responses to all requests that have been received from the first host or the second host are not returned to the first host or the second host, send the busy signal to the first controller and the second controller; and
   in a case where the responses to all the requests that have been received from the first host or the second host are returned to the first host or the second host, end sending the busy signal to the first controller and the second controller.

8. The memory system of claim 6, wherein the first data and the second data each include one of a write request, a read request, and a vendor defined message (VDM) for the nonvolatile memory.

9. The memory system of claim 1, wherein the serial interface is a serial interface that conforms to a PCI Express standard.

10. The memory system of claim 9, wherein the operating state is an L0 state and the low power consumption state is an L1 state, respectively defined in the PCI Express standard.

11. A method of controlling a memory system, the memory system including a nonvolatile memory and being capable of connecting to each of hosts via a serial interface, the hosts including at least a first host and a second host, said method comprising:
   setting a first link between the first host and the memory system to either an operating state or a low power consumption state that consumes lower power than the operating state;
   setting a second link between the second host and the memory system to either the operating state or the low power consumption state;
   processing a request for the nonvolatile memory by using data contained in a packet that is received via each of the first and second links; and
   generating a busy signal in a case where transfer of a packet via either the first link or the second link is predicted, wherein the method further comprises:
      in a case where the first link is in the low power consumption state and a packet has not been received via the first link, maintaining the first link in the low power consumption state by disabling the busy signal; and
      in a case where the first link is in the operating state and a packet has not been received via the first link, transitioning the first link to the low power consumption state in accordance with absence of packets transferred via the first link for a first period of time, by disabling the busy signal.

12. The method of claim 11, further comprising:
   in a case where the second link is in the low power consumption state and a packet has been received via the second link, transitioning the second link from the low power consumption state to the operating state in accordance with the busy signal.

13. The method of claim 11, further comprising:
   in a case where the second link is in the operating state and a packet has been received via the second link, maintaining the second link in the operating state by enabling the busy signal.

14. The method of claim 11, further comprising:
   in a case where the first link is in the operating state and generating the busy signal is ended, transitioning the first link to the low power consumption state in accordance with absence of packets transferred via the first link for the first period of time.

15. The method of claim 11, wherein the memory system further includes a circuit configured to:
   enable the busy signal when a packet has been received via the first link; and
   disable the busy signal when a packet has not been received via the first link.

16. The method of claim 11, further comprising:
   receiving a packet that contains first data via the first link; and
   receiving a packet that contains second data via the second link, wherein
   the busy signal is generated in accordance with reception of either the first data or the second data.

17. The method of claim 16, wherein
   the busy signal is generated in a case where responses to all requests that have been received from the first host or the second host are not returned to the first host or the second host; and
   generating the busy signal is ended in a case where the responses to all the requests that have been received from the first host or the second host are returned to the first host or the second host.

18. The method of claim 16, wherein the first data and the second data each include one of a write request, a read request, and a vendor defined message (VDM) for the nonvolatile memory.

19. The method of claim 11, wherein the serial interface is a serial interface that conforms to a PCI Express standard.

20. The method of claim 19, wherein the operating state is an L0 state and the low power consumption state is an L1 state, respectively defined in the PCI Express standard.

* * * * *